US012724683B2

(12) United States Patent
Okazato et al.

(10) Patent No.: US 12,724,683 B2
(45) Date of Patent: Sep. 1, 2026

(54) TEST SUPPORT APPARATUS, TEST SUPPORT METHOD, AND NON-TRANSITORY COMPUTER READABLE MEDIUM

(71) Applicant: Mitsubishi Electric Corporation, Tokyo (JP)

(72) Inventors: Atsushi Okazato, Tokyo (JP); Yoshihiro Ohta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 66 days.

(21) Appl. No.: 18/830,728

(22) Filed: Sep. 11, 2024

(65) Prior Publication Data

US 2025/0004895 A1 Jan. 2, 2025

Related U.S. Application Data

(63) Continuation of application No. PCT/JP2022/016201, filed on Mar. 30, 2022.

(51) Int. Cl.
*G06F 11/00* (2006.01)
*G06F 11/22* (2006.01)
*G06F 11/263* (2006.01)

(52) U.S. Cl.
CPC ........ *G06F 11/263* (2013.01); *G06F 11/2268* (2013.01)

(58) Field of Classification Search
CPC ............... G06F 11/263; G06F 11/2268; G06F 11/0736; G06F 11/2205; G06F 11/3013
See application file for complete search history.

(56) References Cited

U.S. PATENT DOCUMENTS

| | | | | |
|---|---|---|---|---|
| 5,659,554 | A | 8/1997 | Okayasu | |
| 2010/0235685 | A1 | 9/2010 | Shin | |
| 2016/0274987 | A1* | 9/2016 | Finch | G06F 11/2268 |
| 2018/0266717 | A1* | 9/2018 | Wang | F24F 11/30 |
| 2020/0217542 | A1* | 7/2020 | Nonaka | F24F 11/38 |

(Continued)

FOREIGN PATENT DOCUMENTS

| | | | |
|---|---|---|---|
| JP | 7-253905 | A | 10/1995 |
| JP | 7-271568 | A | 10/1995 |
| JP | 9-223040 | A | 8/1997 |

(Continued)

OTHER PUBLICATIONS

International Search Report (PCT/ISA/210), issued in PCT/JP2022/016201, dated May 17, 2022.

*Primary Examiner* — Joseph D Manoskey
(74) *Attorney, Agent, or Firm* — Birch, Stewart, Kolasch & Birch, LLP

(57) ABSTRACT

A test support apparatus (100) includes an operation definition information conversion unit (120). Regarding each device included in a test subject that includes at least one device, the operation definition information conversion unit (120) generates for each state of each device, state transition information indicating a transition of operation to be executed by each device included in the test subject, based on operation definition information indicating the operation to be executed by each device and an occurrence condition and a release condition corresponding to the operation to be executed by each device.

10 Claims, 7 Drawing Sheets

(56) References Cited

U.S. PATENT DOCUMENTS

| | | | | |
|---|---|---|---|---|
| 2022/0206934 | A1 | 6/2022 | Kirinuki et al. | |
| 2025/0165333 | A1* | 5/2025 | Carville | G06F 11/079 |

FOREIGN PATENT DOCUMENTS

| | | | |
|---|---|---|---|
| JP | 11-306046 | A | 11/1999 |
| JP | 2000-163116 | A | 6/2000 |
| JP | 2008-198103 | A | 8/2008 |
| JP | 2010-211481 | A | 9/2010 |
| JP | 2011-130235 | A | 6/2011 |
| JP | 2012-248101 | A | 12/2012 |
| JP | 2013-57985 | A | 3/2013 |
| JP | 2015-225422 | A | 12/2015 |
| JP | 2018-156626 | A | 10/2018 |
| JP | 2020-109581 | A | 7/2020 |
| WO | WO 2020/230241 | A1 | 11/2020 |

* cited by examiner

100
TEST SUPPORT APPARATUS
110
OPERATION DEFINITION INFORMATION INPUT UNIT
191
OPERATION DEFINITION INFORMATION
120
OPERATION DEFINITION INFORMATION CONVERSION UNIT
192
STATE TRANSITION INFORMATION
140
STATE TRANSITION PROCESSING CONTROL UNIT
130
STATE TRANSITION INFORMATION SEARCH UNIT
193
TEST CASE GROUP

| # | DEVICE NAME | DEVICE STATE | OPERATION | OCCURRENCE CONDITION | | RELEASE CONDITION | | PRIORITY DEGREE |
|---|---|---|---|---|---|---|---|---|
| | | | | ADDRESS | VALUE | ADDRESS | VALUE | |
| 1 | OUTDOOR AIR PROCESSING AIR CONDITIONER | DEVICE OFF | ANTIFREEZE CONTROL | D2122 | 1000 | D2122 | 1000 | 1 |
| | | | | LESS THAN | | EQUAL TO OR MORE THAN | | |
| | | DEVICE ON | ANTIFREEZE CONTROL | D2122 | 1000 | D2122 | 1000 | 2 |
| | | | | LESS THAN | | EQUAL TO OR MORE THAN | | |
| | | | INTERLOCK CONTROL | X100 | 1 | X100 | 0 | 1 |
| | | | | EQUAL | | EQUAL | | |
| | | DEVICE FAILURE | — | — | | — | | — |
| … | … | … | … | … | | … | | … |

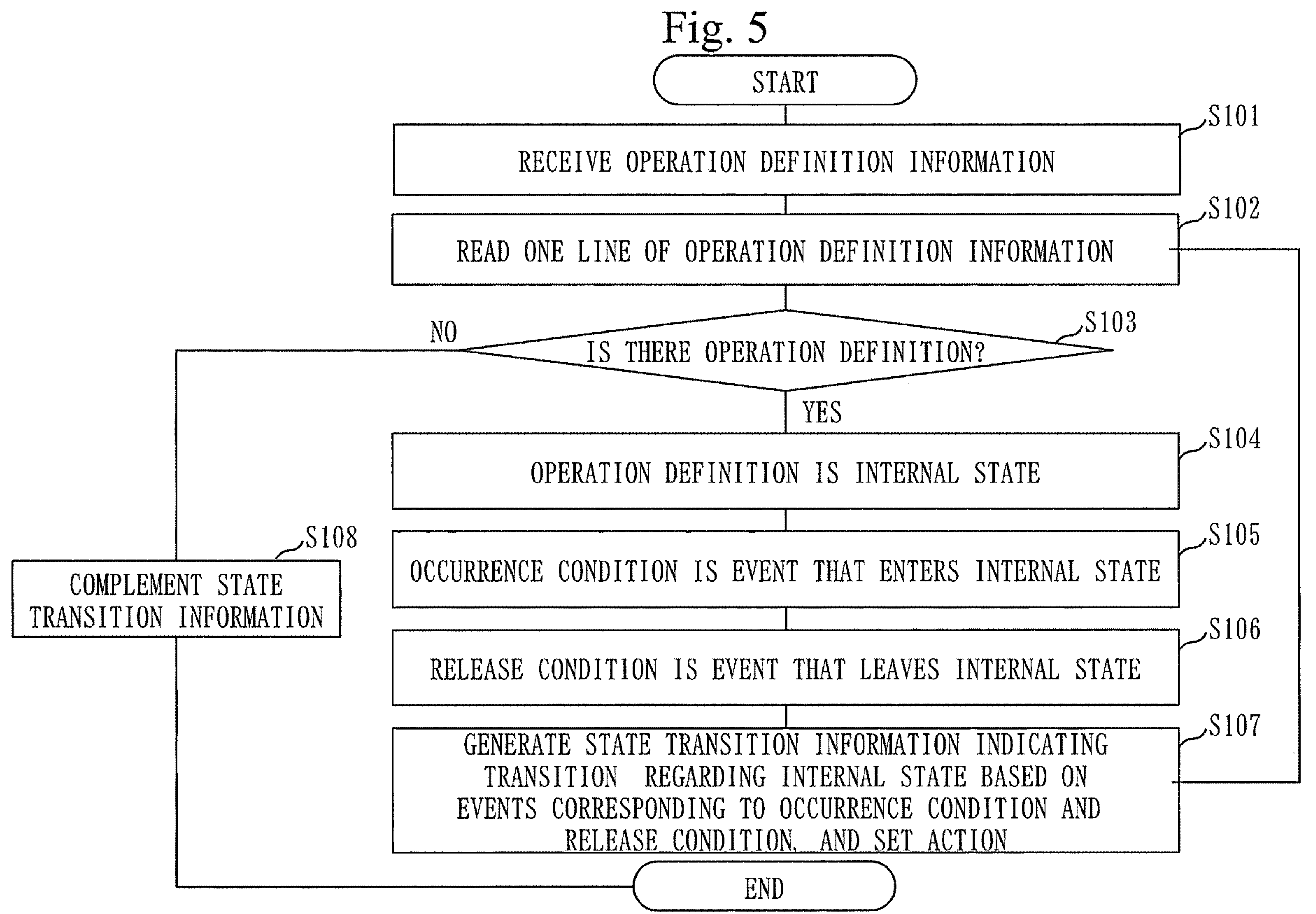
Fig. 5
START
S101
RECEIVE OPERATION DEFINITION INFORMATION
S102
READ ONE LINE OF OPERATION DEFINITION INFORMATION
S103
IS THERE OPERATION DEFINITION?
NO
YES
S104
OPERATION DEFINITION IS INTERNAL STATE
S105
OCCURRENCE CONDITION IS EVENT THAT ENTERS INTERNAL STATE
S106
RELEASE CONDITION IS EVENT THAT LEAVES INTERNAL STATE
S107
GENERATE STATE TRANSITION INFORMATION INDICATING TRANSITION REGARDING INTERNAL STATE BASED ON EVENTS CORRESPONDING TO OCCURRENCE CONDITION AND RELEASE CONDITION, AND SET ACTION
S108
COMPLEMENT STATE TRANSITION INFORMATION
END

Fig. 7

100
TEST SUPPORT APPARATUS
18
PROCESSING CIRCUIT
19
14
INPUT/OUTPUT IF
15
COMMUNICATION DEVICE

TEST SUPPORT APPARATUS, TEST SUPPORT METHOD, AND NON-TRANSITORY COMPUTER READABLE MEDIUM

CROSS REFERENCE TO RELATED APPLICATIONS

This application is a Continuation of PCT International Application No. PCT/JP2022/016201, filed on Mar. 30, 2022, which is hereby expressly incorporated by reference into the present application.

TECHNICAL FIELD

The present disclosure relates to a test support apparatus, a test support method, and a test support program.

BACKGROUND ART

There is a technique to generate a test case based on state transition information. Patent Literature 1 discloses a technique to extract from a product specification description describing the state transition information, a transition path between states, and to generate a test case, using the extracted transition path.

CITATION LIST

Patent Literature

Patent Literature 1: JP H07-253905 A

SUMMARY OF INVENTION

Technical Problem

The technique disclosed in Patent Literature 1 requires a test engineer to design the state transition information. Therefore, this technique has a problem in that the generated test case depends on a test engineer's skill in designing the state transition information.

The present disclosure aims to ensure that the generated test case is independent of the test engineer's skill in designing state transition information, in the technique to generate the test case based on the state transition information.

Solution to Problem

A test support apparatus according to the present disclosure includes an operation definition information conversion unit, regarding each device included in a test subject that includes at least one device, to generate for each state of each device, state transition information indicating a transition of operation to be executed by each device included in the test subject, based on operation definition information indicating the operation to be executed by each device and an occurrence condition and a release condition corresponding to the operation to be executed by each device.

Advantageous Effects of Invention

According to the present disclosure, an operation definition information conversion unit generates state transition information based on operation definition information. Here, a test case may be generated based on the generated state transition information. Thus, according to the present disclosure, it is possible to ensure that the generated test case does not depend on a test engineer's skill in designing the state transition information, in a technique to generate the test case based on the state transition information.

BRIEF DESCRIPTION OF DRAWINGS

FIG. 2 is a diagram illustrating a specific example of operation definition information 191 according to Embodiment 1.

FIG. 5 is a flowchart illustrating operation of the test support apparatus 100 according to Embodiment 1.

FIG. 7 is a diagram illustrating a hardware configuration example of the test support apparatus 100 according to a modification of Embodiment 1.

DESCRIPTION OF EMBODIMENTS

Figure 1:
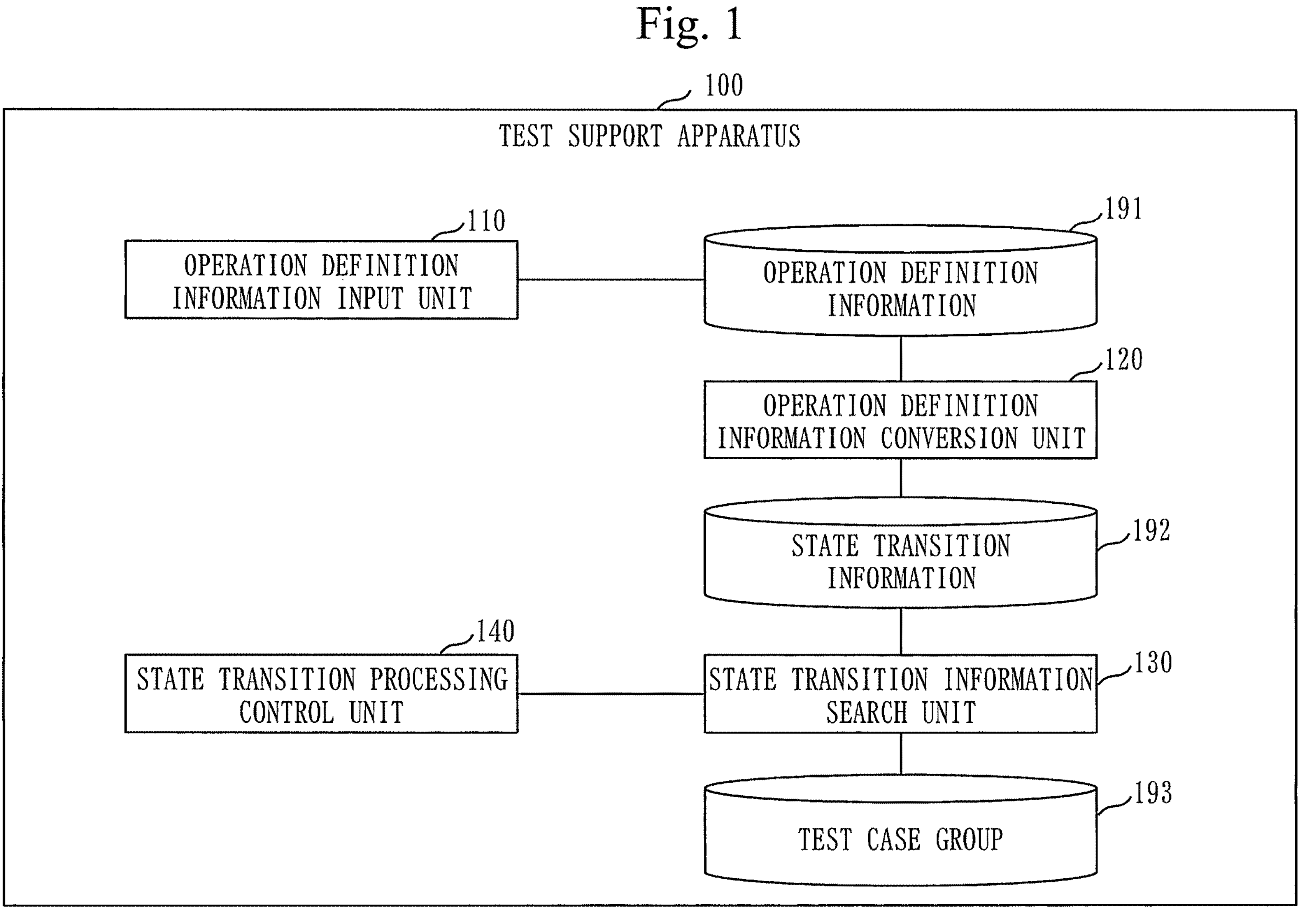
FIG. 1 is a diagram illustrating a configuration example of a test support apparatus 100 according to Embodiment 1.

In the description and drawings of the embodiments, the same elements and corresponding elements are denoted by the same reference sign. Descriptions of elements denoted by the same reference sign will be appropriately omitted or simplified. Arrows in the drawings mainly indicate flows of data or flows of processing. Further, "unit" may be appropriately interpreted as "circuit", "step", "procedure", "process", or "circuitry".

Embodiment 1

The present embodiment will be described below in detail with reference to the drawings.

*Description of Configuration*

FIG. 1 illustrates a configuration example of a test support apparatus 100 according to the present embodiment. The test support apparatus 100 includes, as illustrated in the present diagram, an operation definition information input unit 110, an operation definition information conversion unit 120, a state transition information search unit 130, and a state transition processing control unit 140, and stores operation definition information 191, state transition information 192, and a test case group 193. The test support apparatus 100 is an apparatus that supports a test on a test subject. The test subject is a system constructed using a Programmable Logic Controller (PLC), and is a system that includes at least one device. A specific example of the system is an air conditioner instrumentation system, a Factory Automation (FA) system, or an elevator. The following description will be given in which the test subject is assumed to be the air conditioner instrumentation system, as a specific example. The air conditioner instrumentation system is a system that controls a large number of air conditioners, and is configured with a combination of PLCs.

The operation definition information input unit 110 receives input of the operation definition information 191. The operation definition information input unit 110 may generate the operation definition information 191 based on information indicating a specification of the test subject.

The operation definition information conversion unit 120 generates the state transition information 192 based on the received operation definition information 191. The operation definition information conversion unit 120 may generate based on the operation definition information 191, information indicating a transition from operation indicated in the operation definition information 191 to another operation indicated in the operation definition information 191, as information to be included in the state transition information 192. Here, each operation indicated in the operation definition information 191 is assumed to correspond to an unsteady state. That is, the operation definition information conversion unit 120 may generate information indicating a transition between unsteady states, as the information to be included in the state transition information 192.

The state transition information search unit 130 searches the state transition information 192 for a state transition corresponding to the test case group 193.

The state transition processing control unit 140 checks whether or not the state transition searched for by the state transition information search unit 130 and a state transition of the test subject are consistent with each other. Further, the state transition processing control unit 140 holds information on a constraint or the like of a state transition, and has a function that prevents generation of a test case corresponding to an impossible state transition, by using the held information.

The operation definition information 191 is information on each device included in the test subject, in which operation to be executed by each device and an occurrence condition, a release condition, and the like corresponding to the operation to be executed by each device are defined for each state of each device. The operation definition information 191 may indicate a priority degree corresponding to each operation to be executed by each device included in the test subject. FIG. 2 illustrates a specific example of the operation definition information 191. In FIG. 2, each operation to be executed by an outdoor air processing air conditioner, an occurrence condition and a release condition corresponding to each operation to be executed by the outdoor air processing air conditioner, and a priority degree corresponding to each operation to be executed by the outdoor air processing air conditioner, are defined for each device state of the outdoor air processing air conditioner. An address and a value on a memory, and a condition relating to each value are indicated in each of the occurrence condition and the release condition. Each of the occurrence condition and the release condition is referred to as an event. When a plurality of occurrence conditions are simultaneously met, the test subject decides operation to be executed depending on the priority degree. When the test subject executes the operation indicated in the operation definition information 191, the test subject is in the unsteady state.

The state transition information 192 is information indicating a state transition corresponding to the operation definition information 191. That is, the state transition information 192 is information indicating a transition of operation to be executed by each device included in the test subject.

The test case group 193 consists of at least one test case for the test subject.

Figure 3:
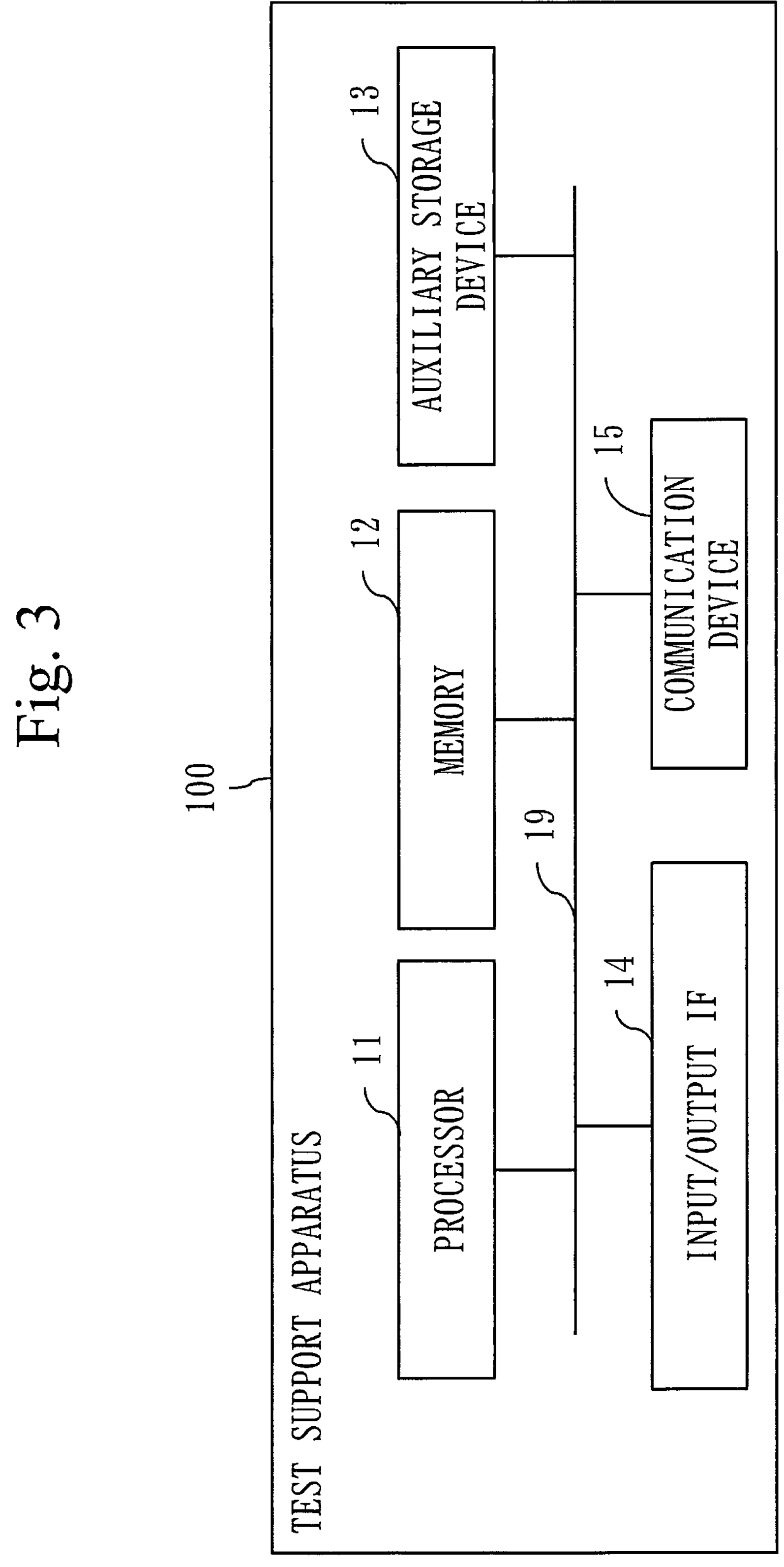
FIG. 3 is a diagram illustrating a hardware configuration example of the test support apparatus 100 according to Embodiment 1.

FIG. 3 illustrates a hardware configuration example of the test support apparatus 100 according to the present embodiment. The test support apparatus 100 consists of a computer. The test support apparatus 100 may consist of a plurality of computers.

The test support apparatus 100 is, as illustrated in the present diagram, the computer that includes pieces of hardware such as a processor 11, a memory 12, an auxiliary storage device 13, an input/output Interface (IF) 14, and a communication device 15. These pieces of hardware are appropriately connected via a signal line 19.

The processor 11 is an Integrated Circuit (IC) that performs arithmetic processing, and controls hardware included in the computer. A specific example of the processor 11 is a Central Processing Unit (CPU), a Digital Signal Processor (DSP), or a Graphics Processing Unit (GPU).

The test support apparatus 100 may include a plurality of processors as an alternative to the processor 11. The plurality of processors share the role of the processor 11.

The memory 12 is typically a volatile storage device, and is, as a specific example, a Random Access Memory (RAM). The memory 12 is also referred to as a main storage device or a main memory. Data stored in the memory 12 is stored in the auxiliary storage device 13 as necessary.

The auxiliary storage device 13 is typically a nonvolatile storage device, and is, as a specific example, a Read Only Memory (ROM), a Hard Disk Drive (HDD), or a flash memory. Data stored in the auxiliary storage device 13 is loaded into the memory 12 as necessary.

The memory 12 and the auxiliary storage device 13 may be configured integrally.

The input/output IF 14 is a port to which an input device and an output device are connected. A specific example of the input/output IF 14 is a Universal Serial Bus (USB) terminal. Specific examples of the input device are a keyboard and a mouse. A specific example of the output device is a display.

The communication device 15 is a receiver and a transmitter. A specific example of the communication device 15 is a communication chip or a Network Interface Card (NIC).

Each unit of the test support apparatus 100 may appropriately use the input/output IF 14 and the communication device 15 when communicating with another device or the like.

The auxiliary storage device 13 stores a test support program. The test support program is a program that causes the computer to implement a function of each unit included in the test support apparatus 100. The test support program is loaded into the memory 12, and executed by the processor 11. The function of each unit included in the test support apparatus 100 is implemented by software.

Data used when the test support program is executed, data obtained by executing the test support program, and the like are appropriately stored in a storage device. Each unit of the test support apparatus 100 appropriately uses the storage device. The storage device consists of, as a specific example, at least one of the memory 12, the auxiliary storage device 13, a register in the processor 11, and a cache memory in the processor 11. Data and information may have the same meaning. The storage device may be independent of the computer.

Functions of the memory 12 and the auxiliary storage device 13 may be implemented by another storage device.

The test support program may be recorded on a computer readable non-volatile recording medium. A specific example of the non-volatile recording medium is an optical disc or a flash memory. The test support program may be provided as a program product.

*Description of Operation*

An operation procedure of the test support apparatus 100 is equivalent to a test support method. Further, a program that implements operation of the test support apparatus 100 is equivalent to the test support program.

Figure 4:
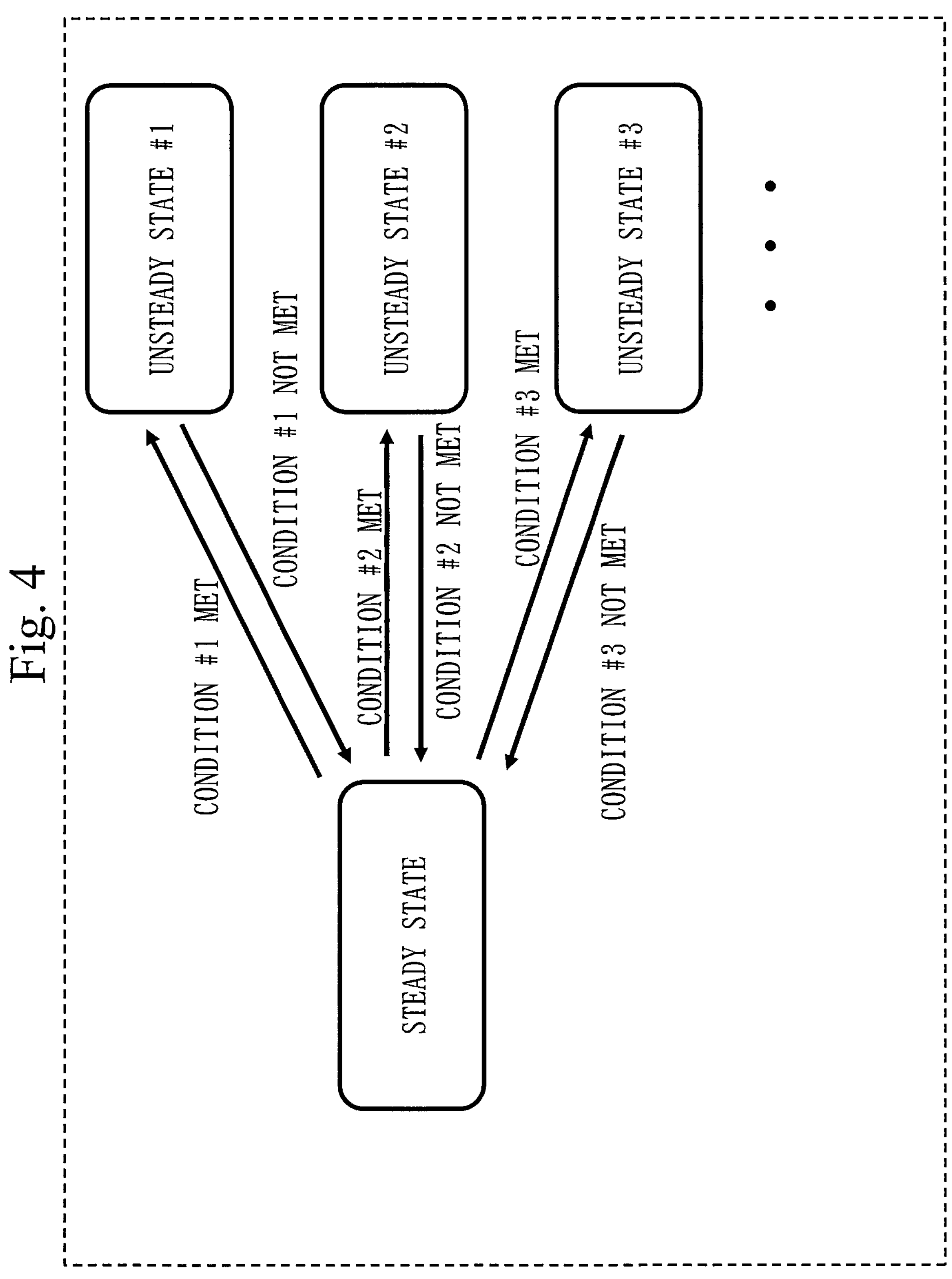
FIG. 4 is a diagram explaining a state transition of a test subject according to Embodiment 1.

FIG. 4 illustrates a typical state transition in an apparatus included in the test subject. As illustrated in FIG. 4, in the state transition corresponding to the apparatus included in the test subject, there is a one-to-many relation between a steady state and unsteady states. In the state transition corresponding to the apparatus included in the test subject, there may be a state transition between unsteady states.

FIG. 5 is a flowchart illustrating an example of operation of the operation definition information input unit 110 and the operation definition information conversion unit 120.

(Step S101)

A test engineer inputs the operation definition information 191 into the operation definition information input unit 110. The test engineer may input the operation definition information 191 in any manner.

(Step S102)

The operation definition information conversion unit 120 reads one line of the operation definition information 191. The one line corresponds to one operation. In the operation definition information 191, it is assumed that there is no operation definition in the last line of each device.

(Step S103)

When there is the operation definition in the read line, the operation definition information conversion unit 120 proceeds to step S104. The operation definition is an operation defined for a device. When the "operation" column of the read line is blank, the operation definition information conversion unit 120 determines that there is no operation definition in the read line. When there is no operation definition in the read line, the operation definition information conversion unit 120 proceeds to step S108.

(Step S104)

The operation definition information conversion unit 120 generates information indicating an internal state corresponding to the operation definition indicated in the read line. The internal state is a state in which each device is executing a certain operation. As a specific example, the state in which the outdoor air processing air conditioner is executing an antifreeze control is the internal state. The test support apparatus 100 may hold information indicating an urgency degree corresponding to each internal state.

(Step S105)

The operation definition information conversion unit 120 generates information indicating an event that enters the internal state indicated in the information generated in step S104, based on the occurrence condition indicated in the read line.

(Step S106)

The operation definition information conversion unit 120 generates information indicating an event that leaves the internal state indicated in the information generated in step S104, based on the release condition indicated in the read line.

(Step S107)

The operation definition information conversion unit 120 generates as a part of the state transition information 192, information indicating that the internal state is entered due to the event which is the occurrence condition and the internal state is left due to the event which is the release condition, based on process results of steps S104 to S106. Further, the operation definition information conversion unit 120 sets an action for the internal state. When setting the action for the internal state, the operation definition information conversion unit 120 uses information separately prepared.

(Step S108)

The operation definition information conversion unit 120 appropriately complements in the state transition information 192, a transition between unsteady states. The operation definition information conversion unit 120 may complement the transition based on the urgency degree corresponding to each state held in the test support apparatus 100.

Figure 6:
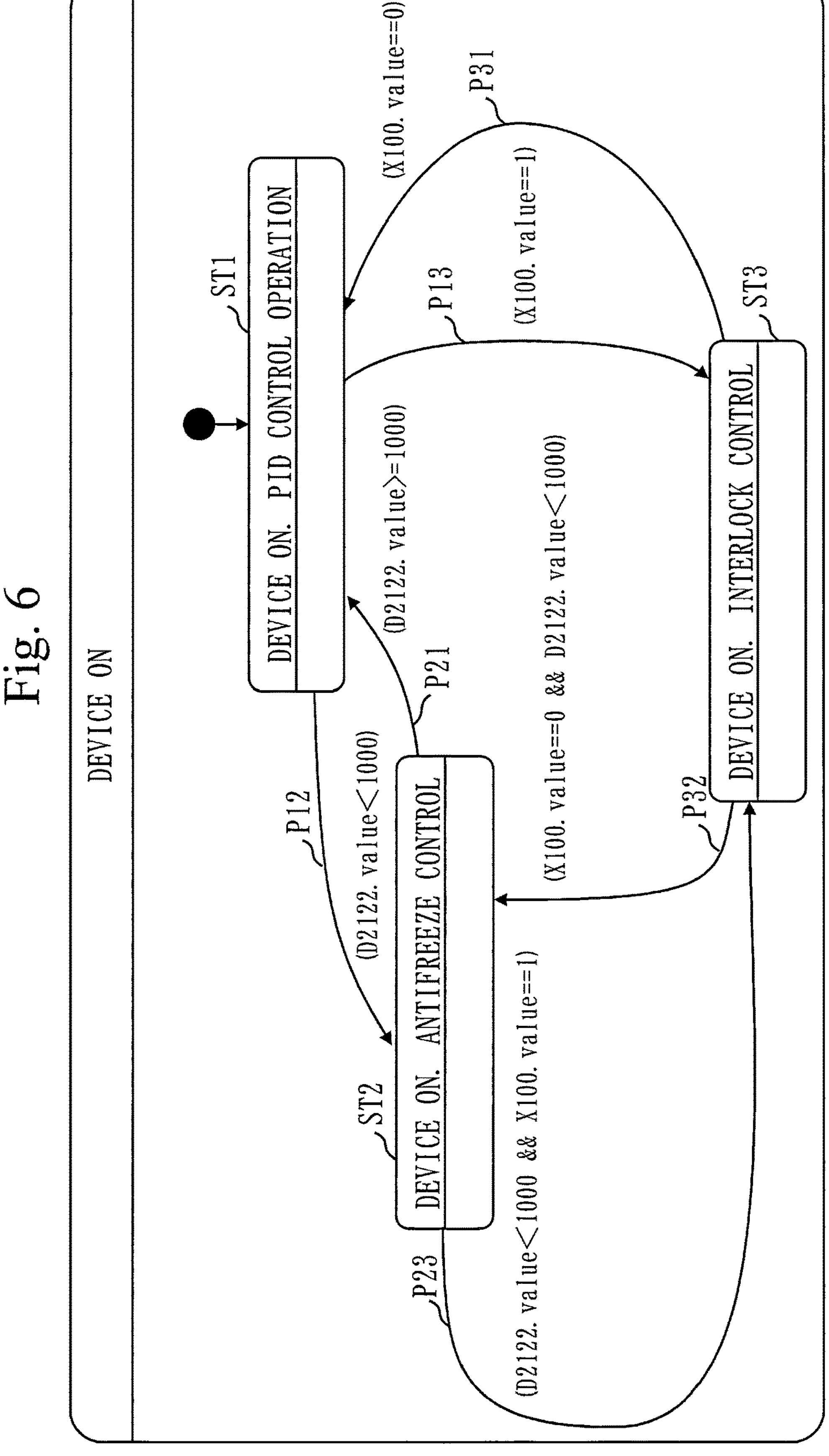
FIG. 6 is a diagram explaining the operation of the test support apparatus 100 according to Embodiment 1.

FIG. 6 is a diagram explaining a process in which the operation definition information conversion unit 120 converts the operation definition information 191 into the state transition information 192, and is a diagram explaining a process in which the operation definition information conversion unit 120 extracts a state transition path and a process in which the operation definition information conversion unit 120 complements a state transition path. FIG. 6 corresponds to the operation definition information 191 illustrated in FIG. 2, and corresponds to a case where the state of the outdoor air processing air conditioner is device ON.

A state ST1 is a default state to which the internal state generated based on the operation definition returns. The default state corresponds to the steady state illustrated in FIG. 4. The operation definition information conversion unit 120 generates, as a specific example, the state ST1 in step S101. The test support apparatus 100 may hold the priority degree corresponding to the default state.

A state ST2 is a state in which the outdoor air processing air conditioner is executing the antifreeze control.

A state ST3 is a state in which the outdoor air processing air conditioner is executing an interlock control.

In step S104, the operation definition information conversion unit 120 generates information indicating each of the state ST2 and the state ST3.

In step S107, the operation definition information conversion unit 120 generates information indicating a path P12 whose occurrence condition is (D2122·value<1000), generates information indicating a path P21 whose release condition is (D2122·value>=1000), generates information indicating a path P13 whose occurrence condition is (X100·value==1), and generates information indicating a path P31 whose release condition is (X100·value==0).

In step S108, the operation definition information conversion unit 120 generates information indicating a path P23 whose occurrence condition is (D2122·value<1000 && X100·value==1), and generates information indicating a path P32 whose release condition is (X100·value==0 && D2122·value<1000).

The path P23 is a state transition path that is complemented based on the priority degree and the urgency degree corresponding to each of the state ST2 and the state ST3. Here, since the priority degree corresponding to the state ST2 is 2, and the priority degree corresponding to the state ST3 is 1, the priority degree corresponding to the state ST3 is higher than the priority degree corresponding to the state ST2. Therefore, when (X100·value==1) which is the occurrence condition corresponding to the state ST3 is satisfied at the time when the state of the outdoor air processing air conditioner is the state ST2, the state of the outdoor air processing air conditioner transitions to the state ST3. The air conditioner instrumentation system basically executes a Proportional-Integral-Differential (PID) control. On the other hand, when the occurrence condition corresponding to the state ST3 is satisfied at the time when the state of the outdoor air processing air conditioner is the state ST2, the state of the outdoor air processing air conditioner is desired to transition to the state ST3 as quickly as possible. Then, the urgency degree is set for the state ST3 in the air conditioner instrumentation system, and a transition from the state ST2 to the state ST3 is defined as a transition in which the outdoor air processing air conditioner directly transitions from the state ST2 to the state ST3, instead of a transition that is implemented by the air conditioner instrumentation system executing the PID control.

The path P32 is a state transition path that is complemented based on the priority degree corresponding to the state ST2 and the priority degree corresponding to the default state held in the test support apparatus 100. The priority degree corresponding to the default state may be set in any manner.

Description of Effects of Embodiment 1

In an air conditioner instrumentation system, when a system designer and a test engineer differs from each other, it is generally difficult for the test engineer to grasp state transitions in the system and to extract a necessary test case. Further, it is generally difficult to fully grasp from a specification and the like of the system, state transitions between unsteady states in the system, and to extract the necessary test case. On the other hand, according to the present embodiment, since the test support apparatus 100 generates the state transition information 192 from the operation definition information 191 that can relatively easily define the behavior of a test subject, the test engineer does not need to grasp state transitions in the system. Here, the state transition information 192 includes information indicating state transitions between unsteady states, and furthermore, the state transition information 192 can be used when a test case for the air conditioner instrumentation system is generated. Therefore, according to the present embodiment, since the state transition information 192 is generated without depending on a skill of the test engineer, a test case to be generated based on the state transition information 192 does not depend on the skill. That is, an application scene of the present embodiment is not limited like the technique disclosed in Patent Literature 1. Further, according to the present embodiment, a test case can be added flexibly based on the state transition information 192.

*Other Configurations*

<Modification 1>

Figure 7:
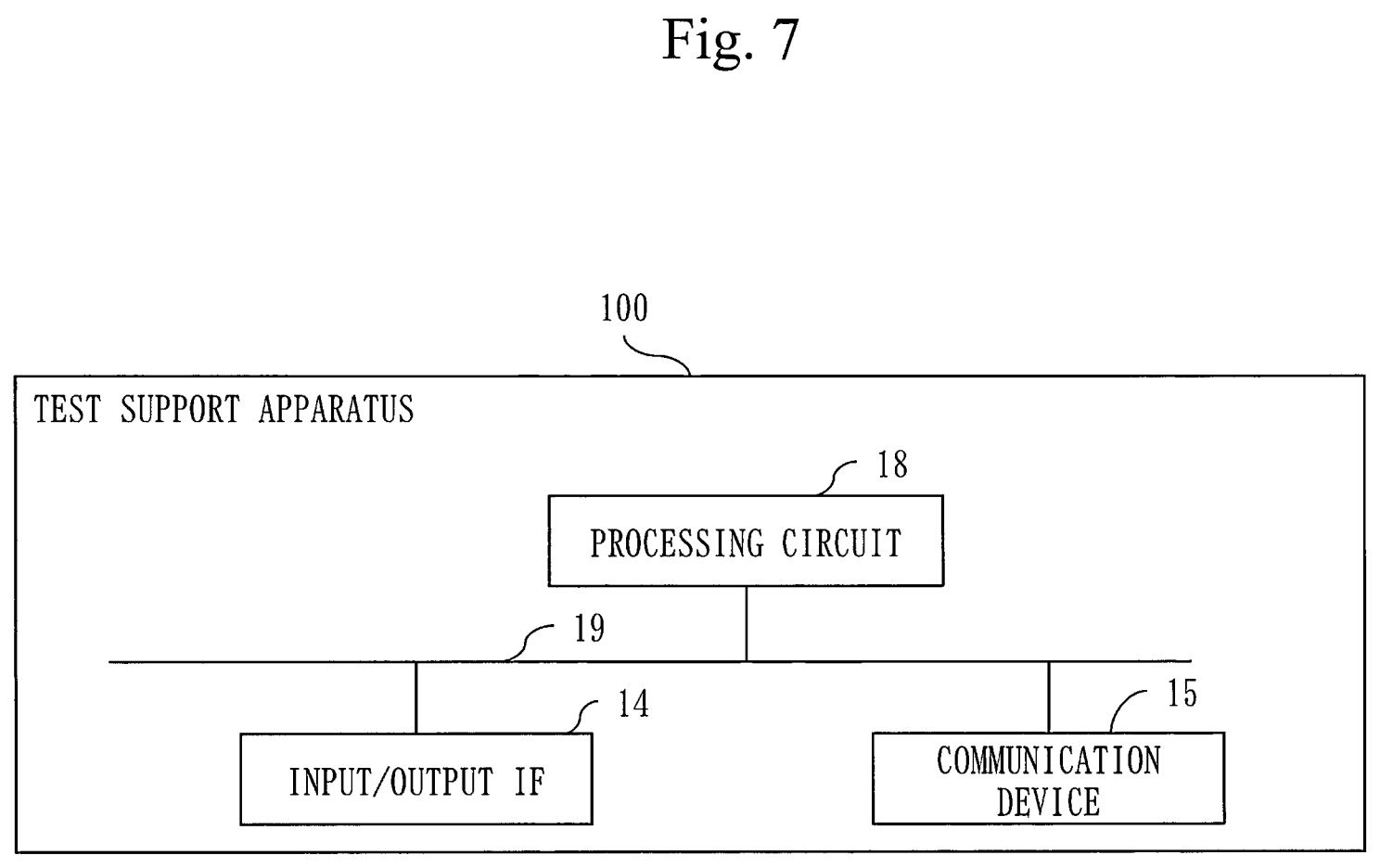

FIG. 7 is a hardware configuration example of the test support apparatus 100 according to the present modification.

The test support apparatus 100 includes a processing circuit 18 in place of the processor 11, the processor 11 and the memory 12, the processor 11 and the auxiliary storage device 13, or the processor 11, the memory 12, and the auxiliary storage device 13.

The processing circuit 18 is hardware that implements at least a part of each unit included in the test support apparatus 100.

The processing circuit 18 may be dedicated hardware, or may be a processor that executes a program stored in the memory 12.

When the processing circuit 18 is the dedicated hardware, a specific example of the processing circuit 18 is a single circuit, a composite circuit, a programmed processor, a parallel programmed processor, an Application Specific Integrated Circuit (ASIC), a Field Programmable Gate Array (FPGA), or a combination thereof.

The test support apparatus 100 may include a plurality of processing circuits as an alternative to the processing circuit 18. The plurality of processing circuits share the role of the processing circuit 18.

In the test support apparatus 100, some functions may be implemented by the dedicated hardware, and the remaining functions may be implemented by software of firmware.

The processing circuit 18 is implemented by, as a specific example, hardware, software, firmware, or a combination of thereof.

The processor 11, the memory 12, the auxiliary storage device 13, and the processing circuit 18 are collectively referred to as "processing circuitry". That is, the functions of the individual functional components of the test support apparatus 100 are implemented by the processing circuitry.

Other Embodiments

Although Embodiment 1 has been described, a plurality of portions of the present embodiment may be implemented in combination. Alternatively, the present embodiment may be partially implemented. In addition, the present embodiment may be modified in various ways as needed, and may be implemented as a whole or in part, in any combination.

The embodiments described above are essentially preferable examples, and are not intended to limit the present disclosure, its applications, and the scope of use. The procedures described using the flowcharts and the like may be appropriately modified.

REFERENCE SIGNS LIST

11: processor; 12: memory; 13: auxiliary storage device; 14: input/output IF; 15: communication device; 18: processing circuit; 19: signal line; 100: test support apparatus; 110: operation definition information input unit; 120: operation definition information conversion unit; 130: state transition information search unit; 140: state transition processing control unit; 191: operation definition information; 192: state transition information; 193: test case group.

The invention claimed is:

1. A test support apparatus comprising processing circuitry:

regarding each device included in a test subject that includes at least one device, to generate for each state of each device, state transition information indicating a transition of operation to be executed by each device included in the test subject, based on operation definition information indicating the operation to be executed by each device and an occurrence condition and a release condition corresponding to the operation to be executed by each device, and to complement the transition indicated in the state transition information, based on an urgency degree corresponding to each state indicated in the state transition information, wherein the operation definition information indicates a priority degree corresponding to each operation to be executed by each device included in the test subject, and the priority degree determines which operation each device executes when a plurality of occurrence conditions are simultaneously met for the device.

2. The test support apparatus according to claim 1, wherein the processing circuitry generates as information included in the state transition information, information indicating a transition from operation indicated in the operation definition information to another operation indicated in the operation definition information, based on the operation definition information.

3. The test support apparatus according to claim 2, wherein states indicated in the state transition information include two unsteady states, and the processing circuitry complements a transition between the two unsteady states, based on an urgency degree corresponding to each of the two unsteady states.

4. The test support apparatus according to claim 3, wherein the test subject is an air conditioner instrumentation system.

5. The test support apparatus according to claim 2, wherein the test subject is an air conditioner instrumentation system.

6. The test support apparatus according to claim 1, wherein states indicated in the state transition information include two unsteady states, and the processing circuitry complements a transition between the two unsteady states, based on an urgency degree corresponding to each of the two unsteady states.

7. The test support apparatus according to claim 6, wherein the test subject is an air conditioner instrumentation system.

8. The test support apparatus according to claim 1, wherein the test subject is an air conditioner instrumentation system.

9. A test support method comprising by a computer, regarding each device included in a test subject that includes at least one device, generating for each state of each device, state transition information indicating a transition of operation to be executed by each device included in the test subject, based on operation definition information indicating the operation to be executed by each device and an occurrence condition and a release condition corresponding to the operation to be executed by each device, and complementing the transition indicated in the state transition information, based on an urgency degree corresponding to each state indicated in the state transition information, wherein the operation definition information indicates a priority degree corresponding to each operation to be executed by each device included in the test subject, and the priority degree determines which operation each device executes when a plurality of occurrence conditions are simultaneously met for the device.

10. A non-transitory computer readable medium storing a test support program for causing a test support apparatus which is a computer to execute an operation definition information conversion process, regarding each device included in a test subject that includes at least one device, to generate for each state of each device, state transition information indicating a transition of operation to be executed by each device included in the test subject, based on operation definition information indicating the operation to be executed by each device and an occurrence condition and a release condition corresponding to the operation to be executed by each device, wherein the operation definition information conversion process complements the transition indicated in the state transition information, based on an urgency degree corresponding to each state indicated in the state transition information, wherein the operation definition information indicates a priority degree corresponding to each operation to be executed by each device included in the test subject, and the priority degree determines which operation each device executes when a plurality of occurrence conditions are simultaneously met for the device.

* * * * *